Nov. 18, 1969  H. R. ALLEN ET AL  3,479,594
INDICATOR HAVING NONLINEAR DAMPING
Filed July 6, 1967
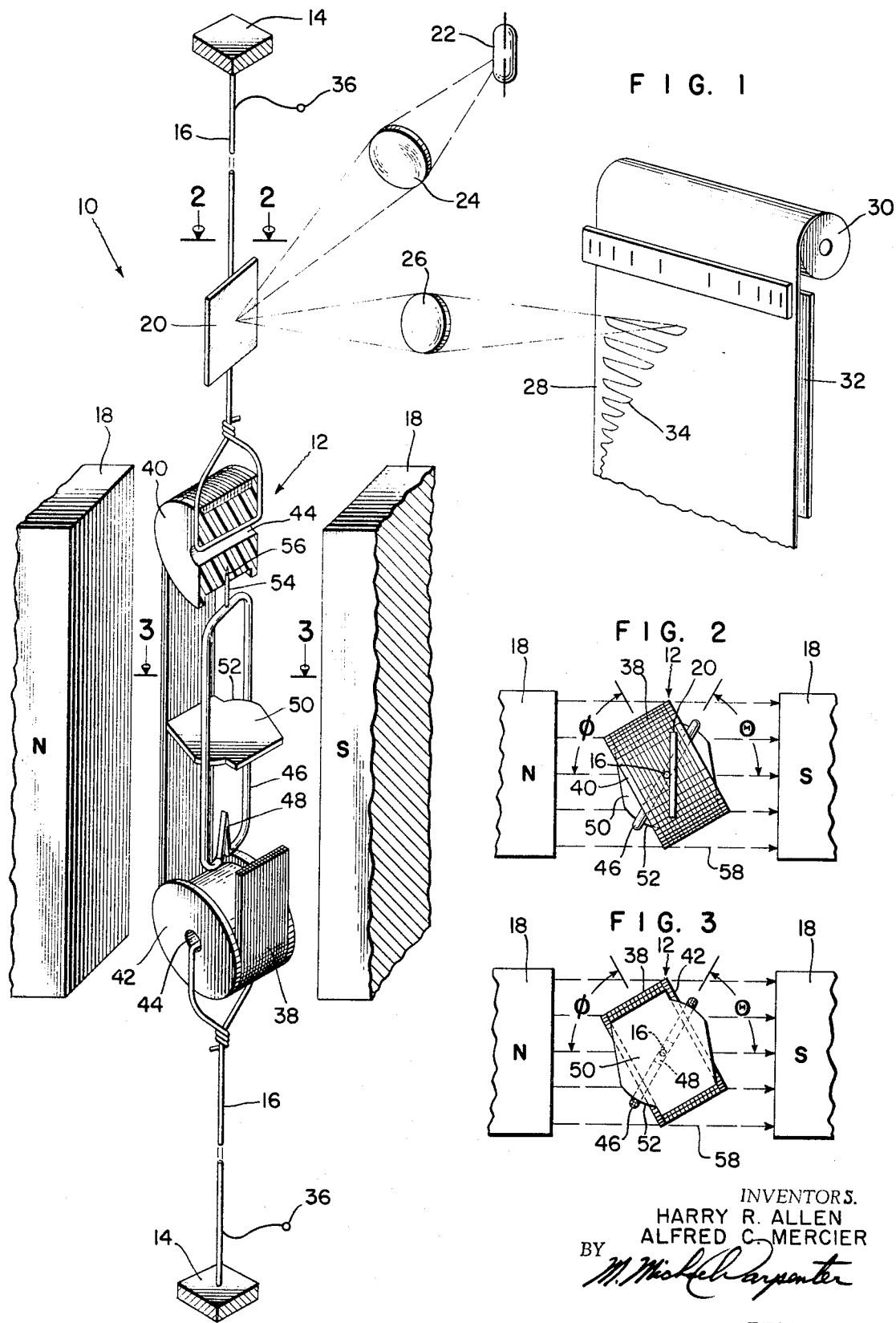
INVENTORS.
HARRY R. ALLEN
ALFRED C. MERCIER
BY
ATTORNEY.

3,479,594
INDICATOR HAVING NONLINEAR DAMPING
Harry R. Allen, Littleton, and Alfred C. Mercier, Englewood, Colo., assignors to Honeywell Inc., Minneapolis, Minn., a corporation of Delaware
Filed July 6, 1967, Ser. No. 651,533
Int. Cl. G01r 1/14
U.S. Cl. 324—125    6 Claims

ABSTRACT OF THE DISCLOSURE

A nonlinear galvanometer having a signal coil suspended within a magnetic field by a suspension system to which a mirror is attached. The mirror reflects a beam of light from a light source toward a light sensitive recording medium for providing an indication of an input signal applied to the signal coil. The signal coil is positioned at an acute angle with respect to the magnetic field for producing a nonlinear coil deflection in response to the input signal applied thereto. A damping coil, arranged at at an acute angle with respect to the magnetic field for plying a nonlinear damping to the galvanometer. The arrangement of the coils is such that the angular relationship between one coil and the magnetic field increases as the angular relationship of the other decreases.

---

The present invention relates to an indicator having nonlinear damping and, more particularly, to a nonlinear galvanometer indicating device having a nonlinear natural frequency which is provided with a nonlinear damping means for reducing the unwanted oscillation thereof.

Conventional oscillographic galvanometers produce a linear output in response to an input signal applied thereto. If the current of the input signal were increased beyond the conventional range of the galvanometer, the output produced thereby is characteristically a logarithmic response. This same result may be achieved for lower input signal currents by specially biasing the galvanometer coil. A device incorporating this principle in a nonlinear galvanometer has been described in a copending patent application Ser. No. 642,747 by Larry J. Girard, filed June 1, 1967, and assigned to the same assignee as the present invention. In such a nonlinear galvanometer, the undamped oscillation is nonlinear throughout the measuring range. Therefore, a nonlinear damping technique is required for allowing the galvanometer coil to reach its final position of rest in the shortest possible time interval. It is well known in the prior art to provide a damping coil within a conventional galvanometer, but a nonlinear galvanometer requires a nonlinear damping technique due to the presence of a natural frequency that varies in a nonlinear relationship to the angular displacement thereof. It has been found that an ideal damping arrangement can not be provided. The best that can be achieved is the provision of a damping coil accurately arranged with respect to the signal coil for providing the best compromise of damping that allows the signal coils to reach its final position of rest in the shortest time interval. Accordingly, one object of the present invention is to provide an improved nonlinear damping arrangement for a nonlinear indicating device.

Another object of the invention presented herein is to provide nonlinear damping within a galvanometer without substantially increasing the inertia of the moving components within the galvanometer.

Still another object of the present invention is to provide the best compromise between a nonlinear damping arrangement within a nonlinear galvanometer for establishing a maximum damping at all output frequencies of the galvanometer.

A further object of the present invention is to provide a means for initially adjusting the relationship between the signal coil of a nonlinear galvanometer and the damping coil associated therewith for providing a nonlinear damping therefor.

Yet a further object of the invention presented herein provides for an adjustable nonlinear damping coil which may be finely adjusted after its initial adjustment for accurately and economically providing the best compromise adjustment within a nonlinear galvanometer between the signal coil and damping coil thereof.

Other objects and many of the attendant advantages of the present invention will become readily apparent to those skilled in the art as a better understanding thereof is obtained by reference to the following description when considered in connection with the accompanying drawings, wherein:

FIG. 1 is a schematic representation partially broken away, showing a vibratory assembly utilized within a nonlinear galvanometer incorporating the present invention;

FIG. 2 is a horizontal view taken along line 2—2 of FIG. 1, showing the signal coil and damping coil of the galvanometer and their relationship to the magnetic field thereof; and FIG. 3 is a horizontal view taken along line 3—3 of FIG. 1, showing the means for obtaining initial adjustment of the damping coil with respect to the signal coil of the galvanometer.

When a conventional galvanometer is operated in a nonlinear condition, as in the nonlinear galvanometer disclosed by Girard (Ser. No. 642,747), the natural frequency thereof varies in proportion to the sine of the angle of rotation. An input signal current applied to the coil causes the signal coil to move toward a final position of rest determined by the amplitude of the input signal and the permanent magnetic field of the galvanometer. An undamped signal coil will oscillate across the final position of rest in a simple harmonic motion. The frequency of this oscillation is proportional to the sine of the angle between the signal coil and the direction of the permanent magnetic field. Since the undamped oscillation is nonlinear throughout the measuring range of the galvanometer, a nonlinear damping technique is required to allow the coil to reach its final position of rest in the shortest possible time interval. The damping coil of the present invention constitutes such a nonlinear damping technique. In the prefered embodiment of the present invention, the indication of the galvanometer is established by a trace formed by a mirror attached to the galvanometer suspension system for reflecting a light beam from a suitable light source toward a recording medium. The damping can be determined by the amount of overshoot made by the trace upon the recording medium when recording the leading edge of a square wave. This damping is related to a damping ratio wherein the rate of decay of the oscillation about the final position of rest or the ratio of the displacement of successive excursions of a recording trace from the final position of rest is defined as the damping ratio. This damping ratio is expressed mathematically as:

$$D.R. = \frac{CB^2N^2W^2L^2 \cos^2 \theta}{R\sqrt{I(K+Bnwli \sin \phi)}}$$

where:

C = Units conversion factor
B = Flux density formed by the permanent magnetic field
N = Number of turns within the damping coil
W = Width of the damping coil
L = Length of the damping coil
θ = Angle between damping coil and direction of the permanent magnetic field R = Resistance of the damping coil
I = System inertia
K = Suspension restoring torque
$n$ = Number of turns in the signal coil
$w$ = Width of the signal coil
$l$ = Length of the signal coil
$i$ = Current within the signal coil
$\phi$ = Angle between signal coil and direction of the permanent magnetic field It should be noted that the expressions within the equation are all fixed parameters with the exception of $i$, sin $\phi$, and $\cos^2 \theta$. These functions are nonlinear as defined by the nonlinear operating conditions of the galvanometer. Thus, the damping ratio cannot be equal for all values of coil rotation within the operating range of the nonlinear galvanometer. It is therefore necessary to find the best compromise of damping which will allow the coil to reach its final position of rest in the shortest possible time. In accomplishing this result it is necessary to arrange the signal coil and damping coil such that the angle $\theta$, defined as the angle between the damping coil and the magnetic field, decreases as the angle $\phi$, defined as the angle between the signal coil and the magnetic field, increases.

The initial angular relationship between the signal coil and the damping coil may be established from the values of the parameters defined in the equation set out hereinabove. The angle $\phi$ is determined by the performance characteristic desired within the nonlinear galvanometer. The parameters of the signal coil are also determined by the requirements of the nonlinear galvanometer. A damping coil having a fixed configuration is constructed and affixed to the signal coil of the galvanometer for providing the required nonlinear damping. The relationship between the signal coil and the damping coil is a critical one, however, and the proper alignment can only be obtained through careful adjustment. One adjustment may be obtained by rotating the damping coil for adjusting the coil angle ($\cos^2 \theta$) within the magnetic field. A second adjustment may be achieved by adjusting the resistance of the damping coil. Thus, the damping coil of the present invention has been constructed for allowing an initial rotational adjustment, with respect to the signal coil, and a final impedance adjustment by varying the resistance thereof.

Referring now to the drawings, an oscillographic galvanometer is shown generally at 10, FIG. 1, having a coil assembly 12 supported from a main frame 14 by suitable suspension filaments 16. The galvanometer coil assembly 12 is suspended within a permanent magnetic field formed by suitable magnetic pole pieces 18. A mirror 20 is attached to the upper suspension filament 16, as by bonding. A source of ultraviolet light 22 is focused through a first lens 24 onto the mirror 20 and reflected therefrom through a second lens 26 where it is focused onto a light sensitive recording medium 28. The recording medium 28 is stored upon a reel 30 and arranged to be drawn over a platen 32 where a recording trace 34 is formed thereon. An input signal current is applied to the galvanometer coil assembly 12 through input terminals 36 which attach to the outermost portions of the suspension filaments 16.

The galvanometer coil assembly 12 includes a galvanometer signal coil 38 for receiving the input signal current from the terminals 36 along the suspension filaments 16. The signal coil 38 is wrapped about upper and lower coil supporting spools 40 and 42, respectively, which are provided with apertures 44 passing through the longitudinal axes thereof. Each suspension filament 16 is threaded through a spool aperture 44, looped back upon itself, and then wrapped about itself for completing the suspension of the vibratory assembly of the galvanometer. A damping coil 46 is formed from a generally O-shaped single loop of conductive wire having the lower portion thereof separated for providing an opened electrical circuit therein. A second generally U-shaped loop 48, formed from a single loop of highly resistive wire, is arranged in shunting relationship across the opened electrical circuit. This second U-shaped loop 48 combines with the O-shaped loop 46 for forming a coplanar loop that establishes the damping coil. A bridge member 50 is provided between the multiple turns of wire which form the signal coil 38. The bridge member is generally flat having two opposite edge surfaces 52 arcuately arranged with the centers thereof corresponding to the center of the bridge member, as best seen in FIG. 3. The width of the bridge member 50, between its arcuate edge surfaces 52, equals the inner diameter of the damping coil 46. In this manner, the bridge 50 may be placed inside the damping coil 46 and perpendicularly attached to the inner surface of the signal coil 38, as by bonding, to provide a bracing support for the damping coil.

The upper portion of the O-shaped damping coil 46 is provided with a pivot pin 54. The upper supporting spool 40 is arranged with an aperture 56 in the center of its lower periphery for receiving the pivot pin 54 of damping coil 46. Thus, after the bridge member 50 is positioned in its proper location, the damping coil 46 is raised until the pivot pin 54 engages in the aperture 56. The width of the bridge member 50 at its arcuate edges 52 is sufficient to frictionally engage the damping coil 46 and retain it in its proper position during the initial adjustment of the galvanometer coil assembly 12. Once the initial angular adjustment between the damping coil 46 and the signal coil 38 has been established, the damping coil 46 is permanently attached to the bridge 50, as by bonding. The fine adjustment of the coil assembly 12 is achieved by removing a portion of the highly resistive U-shaped loop 48, as by cutting, and rejoining the loop, as by soldering. This procedure reduces the resistance of the damping loop for completing the fine adjustment of the galvanometer coil assembly 12.

Referring now to FIG. 2, the permanent magnetic field of the galvanometer is illustrated by the directional flux lines 58 passing between the pair of magnetic pole pieces 18. The signal coil 38 is offset at an acute angle with respect to the permanent magnetic field. The offset is measured by an angle $\phi$ which is established between the plane of the signal coil 38 and the direction of the flux lines 58 formed by the permanent magnetic field. The damping coil 46 is also offset within the permanent magnetic field at an acute angle $\theta$ formed between the plane of the damping coil 46 and the direction of the flux lines 58 of the magnetic field.

An input signal current passing through the signal coil 38 produces a flux therein which is generally perpendicular to the plane thereof. This produced flux tends to align itself with the flux of the magnetic field represented by the flux lines 58 thus causing the galvanometer coil 38 to be rotatably deflected. In a conventional galvanometer, the deflection is substantially linear while the input current is in the operating region thereof. As the input signal current increases, the corresponding deflection of the signal coil becomes a logarithmic function. Finally, as the input signal reaches its maximum values, the deflection of the galvanometer is much reduced and asymptotically approaches an upper limit determined by the galvanometer system. By offsetting the signal coil 38 at a predetermined angle $\phi$, the initial output of the galvanometer 10 is transformed from its generally linear characteristic into a nonlinear output. Operating in this nonlinear range, the natural frequency of the galvanometer will vary proportionally with the sine of the angle of rotation. As the undamped oscillation of the galvanometer coil is nonlinear, it becomes necessary to provide a corresponding nonlinear damping therefore.

The offset angle $\phi$ of the signal coil 38 is determined by the desired output function of the galvanometer 10. Once the parameters of the signal coil 38 are established, such as length, width and number of turns, the parameter of the damping coil may be established. With the physical parameters of the signal coil 38 and damping coil 46 established, the remaining parameters such as flux intensity, coil resistance, system inertia, and suspension restoring torque may be calculated. After these values are fixed and with a desired damping ratio in mind, it is now possible to calculate the necessary offset angle $\theta$ of the damping coil 38. Once this angle has been determined, the galvanometer coil assembly 12 may be adjusted by displacing the single turn damping coil 46 to the desired angular relationship with the signal coil 38. After the angular relationship between the two coils 38 and 46 has been established, the damping coil 46 is attached to the bridge member 50, as by bonding. The galvanometer is then energized and tested under operating conditions. It is impossible to establish the critical angular relationship between the signal coil 38 and damping coil 48 and, at the same time, compensate for other variations, such as the inertia and internal resistance of the two coils. Thus, it becomes necessary to make a final adjustment of the galvanometer coil assembly after the assembly thereof. This is accomplished by recording an input signal, in the form of an increasing square wave, and observing the amount of oscillation about the final positions of rest formed by each step of the square wave. Through this observation, the damping ratio can be determined and the necessary adjustment of the damping coil resistance calculated. The angular relationship of the damping coil 46 is established such that the resistance thereof must always be reduced for achieving the final adjustment. Thus, the resistance of the damping coil 46 is decreased by removing a portion of the highly resistive U-shaped loop 48 and rejoining the loop to reform a closed electrical circuit therein and complete the fine adjustment of the galvanometer coil assembly 12.

While but one embodiment of the damping coil has been described herein, it will be obvious to those skilled in the art that other damping coil configurations are possible. For example, a loop may be constructed which may be moved axially along the axis formed by the suspension filaments for varying the cross sectional area of the damping loop which is positioned within the permanent magnetic field of the pole pieces 18. Another configuration utilizes a loop which is generally U-shaped with the open portion thereof joined by a plurality of circular support wires having a smaller diameter and a larger resistance than the main U-shaped loop. The length of this damping loop is then adjusted by removing some of the upper support wires while the resistance thereof is varied by removing some of the lower support wires.

The embodiments of the invention in which an exclusive property or privilege is claimed are defined as follows:

1. In a low inertia nonlinear indicating device for indicating an input signal having signal coil means suspended within a magnetic field for deflection upon application of said input signal to said coil means, the improvement comprising: means biasing said signal coil means into an acute angular relationship with said magnetic field, damping coil means suspended within said magnetic field, means biasing said damping coil means into an acute angular relationship with said magnetic field, and said means biasing said signal coil means and said damping coil means arranged for permitting said acute angular relationship with the magnetic field of said signal coil means to increase as said acute angular relationship of said damping coil means decreases, thereby providing nonlinear damping for said nonlinear indicating device.

2. A low inertia nonlinear galvanometer for providing a nonlinear indication of a high frequency input signal having means for nonlinear damping of said indication, comprising:

means for establishing a permanent magnetic field,
signal coil means,
suspension filament means supporting said signal coil means within said permanent magnetic field,
said suspension filament means arranged for biasing said signal coil means at an acute angle to said magnetic field,
damping coil means,
means coaxially supporting said damping coil means in concentric relationship with said signal coil means for biasing said damping coil means at an acute angle to said magnetic field,
said suspension filament means arranged for biasing said signal coil means and said means coaxially supporting said damping coil means arranged for permitting the angle between said signal coil means and said magnetic field to increase as the angle between said damping coil means and said magnetic field decreases, and
means operative to apply said input signal to said signal coil means thereby causing nonlinear deflection of said galvanometer for establishing a nonlinear damping of said deflection.

3. A low inertia nonlinear galvanometer as claimed in claim 2, wherein said signal coil means additionally comprises a pair of support means attached to said suspension filament means and a multiturn coil supported therebetween, and said damping coil means additionally comprises a single turn coil concentrically supported by said support means within said multiturn signal coil.

4. A low inertia nonlinear galvanometer as claimed in claim 3 wherein said single turn of said damping coil means additionally comprises pin means extending from the upper surface of said coil means parallel to the plane thereof, and said support means includes means for receiving said pin means for allowing said damping coil means to pivot thereabout and thus provide said means for biasing said damping coil means.

5. A low inertia nonlinear galvanometer as claimed in claim 4 additionally comprising bridge means attached to said signal coil means between said support means thereof for engaging said damping coil means and providing said concentrical support therefor.

6. A low inertia nonlinear galvanometer as claimed in claim 3 additionally comprising said single turn of said damping coil means having an opening for providing an electrical short therein, shunting means for closing said electrical short, said shunting means having a generally U-shaped low inertia configuration and an impedance differing from the impedance of said single turn damping coil means for allowing removal of portions thereof to adjust the total impedance of said damping coil means.

References Cited

UNITED STATES PATENTS 2,639,307   5/1953   Bakke _____ 324—125

FOREIGN PATENTS 969,165   5/1958   Germany.

ALFRED E. SMITH, Primary Examiner

U.S. Cl. X.R.

324—97, 132